United States Patent [19]

Carpaneto

[11] Patent Number: 4,461,243
[45] Date of Patent: Jul. 24, 1984

[54] STEAM OR HOT WATER GENERATOR OPERATING BY SOLID FUELS HAVING HIGH CONTENTS IN VOLATILE MATERIALS

[75] Inventor: Giovanni Carpaneto, Milan, Italy

[73] Assignee: Officine Meccaniche Carbofuel S.p.A., Varese, Italy

[21] Appl. No.: 343,125

[22] Filed: Jan. 27, 1982

[30] Foreign Application Priority Data

Feb. 4, 1981 [IT] Italy ............................... 19497 A/81

[51] Int. Cl.³ ............................................. F22B 31/04
[52] U.S. Cl. ........................................ 122/15; 122/2; 122/22; 110/234
[58] Field of Search .................. 110/234; 122/2, 15, 122/22

[56] References Cited

U.S. PATENT DOCUMENTS

| | | | |
|---|---|---|---|
| 1,283,668 | 11/1918 | Cherry | 122/22 |
| 1,690,260 | 11/1928 | Wallis | 122/2 |
| 1,856,693 | 5/1932 | Corbin, Jr. | 122/15 |
| 3,213,832 | 10/1965 | Jakobsson | 122/2 |
| 3,223,074 | 12/1965 | Tanner et al. | 122/2 |
| 4,162,686 | 7/1979 | Infield et al. | 122/22 |
| 4,206,723 | 6/1980 | Kunkel | 122/22 |
| 4,213,405 | 7/1980 | Lis et al. | 122/2 |
| 4,296,711 | 10/1981 | Bilberg | 122/2 |
| 4,296,712 | 10/1981 | Vogt | 122/22 |

FOREIGN PATENT DOCUMENTS

| | | | |
|---|---|---|---|
| 1081994 | 5/1960 | Fed. Rep. of Germany | 122/2 |
| 1238643 | 4/1967 | Fed. Rep. of Germany | 122/2 |
| 2540709 | 3/1977 | Fed. Rep. of Germany | 122/2 |
| 2930301 | 3/1981 | Fed. Rep. of Germany | 122/22 |
| 966236 | 8/1964 | United Kingdom | 122/2 |

Primary Examiner—Henry C. Yuen

[57] ABSTRACT

A steam or hot water generator, operating by solid fuels having high contents in volatile materials, provides that the column of fuel bears on an inwardly inclined grate. A fraction of the carbureting air passes through the grate and fuel, carrying along the volatile products. Another fraction of air, not passing through the grate and accordingly also not through the fuel, but which is however heated by travelling under the grate, joins with the fraction rich in volatile products which is still unburnt, bringing the latter to combustion.

2 Claims, 3 Drawing Figures

STEAM OR HOT WATER GENERATOR OPERATING BY SOLID FUELS HAVING HIGH CONTENTS IN VOLATILE MATERIALS

This invention relates to a steam or hot water generator operating by fuels having high contents in volatile materials, column weighing on a grate passed through by the carbureting air, and in which the resulting gases are led through a heat exchanger before arriving at the stack.

The conventional generators of this type do not achieve high combustion efficiencies due to the high contents in unburnt products in the smokes.

Therefore, it is the primary object of the present invention to improve the generator so as to increase the combustion efficiency thereof.

It is another object of the present invention to provide a generator, in which the deposits are substantially reduced on those surfaces along which the heat exchange between smokes and water, tending to reduce the coefficient of heat transfer.

These objects, in addition to further objects which will become evident from the following detailed description, are achieved by a generator of the above-specified type; a generator which is essentially characterized in that the grate is inclined relative to the horizontal and towards a gas outlet chamber, having an opening therein for directing air travelling under the grate and being thereby preheated.

A first embodiment provides that the generator is of natural draught, while other embodiments provide a supply of carbureting air by forced ventilation, in the case with recirculation of the combustion products.

The invention will be better understood from the following detailed description, given by mere way of unrestrictive example, of a preferred embodiment thereof, as shown in the accompanying drawings, in which.

Figure 1:
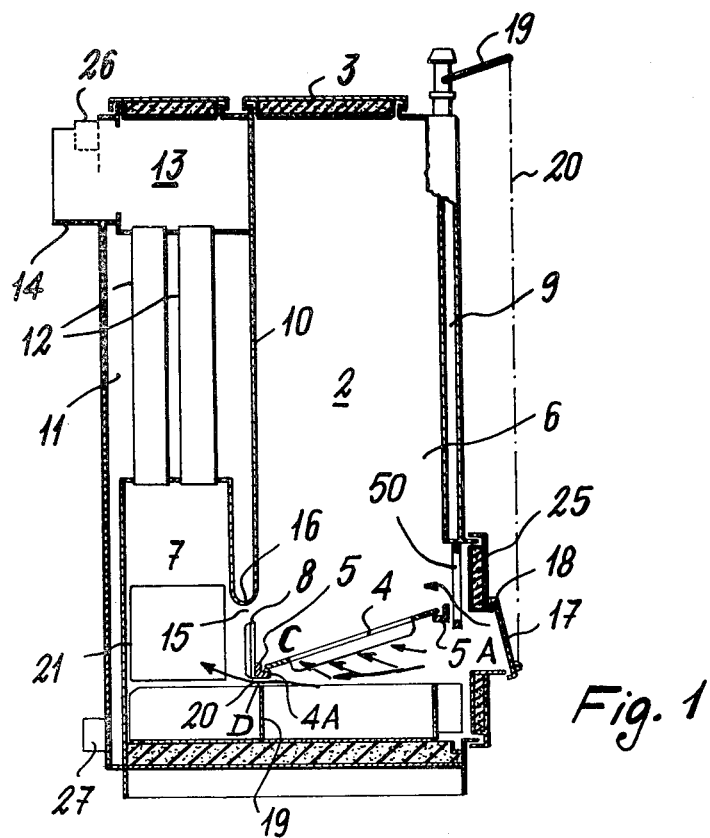
FIG. 1 is a schematic longitudinal vertical sectional view of the boiler.

Referring to the figures of the accompanying drawings, reference numeral 1 designates a hot water generator operating by solid fuels, which comprises a loading well or hopper 2, which is filled up with solid fuel through an openable or releasable door 3 located at the top. The load or fuel column weighs on an underlying grate 4 inclined with respct to the horizontal, so that its innermost portion 4A is at a lower level than the opposite portion thereof. The grate is conventionally made of cast iron, and bears at the ends on profiles 5, the latter being secured in any known manner to the side walls 6 of the generator.

In order to prevent the fuel from sliding along the grate 4 and moving into a rearward chamber 7, which may be referred to as a post-combustion chamber, a vertical grate 8 is provided as extending throughout the width of the first mentioned grate.

The loading well or hopper 2 is laterally defined by the side water jacket walls 6, at the front by the water jacket wall 9 communicating with the side jackets 6, and at the rear by a wall 10.

By its other face, said wall 10 defines a water-loaded space 11, hydraulically connected with the side jackets 6 and passed through by vertical smoke tubes 12 starting from the post-combustion chamber 7 and terminating in a collection chamber 13 connected through the connector 14 with the stack, not shown.

The post-combustion chamber 7 communicates with the well or hopper 2 through the vertical grate 8 and an overlying passage 15, defined at the top by the curved lower end 16 of the wall 10. As shown on the figures of the accompanying drawings, said chamber 7 extends for some length above the lower end 16, in order that such a chamber should have a sufficient volume to complete the combustion of the volatile products resulting from the fuel distillation.

In order to provide for access or admission of carbureting air, a door 17 is provided at the front and hinged at the top at 18, the opening of which can be regulated by a lever 19, restrainable at various positions and connected by a tie rod 20 to the door. As shown by the figures of the accompanying drawings, the door 17 allows the inflow of air both to below the grate 4 and through a front vertical grate 50. Owing to the particular inclined arrangement of the latter, the carbureting air increases relative to the fuel layer towards the lower end 4A of the grate 4, so that an excess of concentrated air is available at this location, which excess is required for the combustion of the generated gases.

A vertical transverse partition or other similar obstacle, denoted at 19, extends from wall to wall 6 at or adjacent the lowermost location 4A of the grate 4, but leaving below the latter an opening or window, in the case adjustable from the outside, designated at 20, through which secondary air, preheated by passing under the grate, reaches said chamber 7, therein completing the combustion of the gases arriving thereat through the grate 8 and passage 15.

The ash removal can be effected through a side door 21 leading to the chamber 7 and provided in one of said side walls 6. Such a removal could also be effected through the door 17 or other removable lower portion of the frontal piece or element of the generator. The door 17 is carried by an insulated plate 25 which is secured to the front piece or element of the boiler, such as by means of bolts or by hinge.

The water inlet and outlet pipe unions are designated at 26 and 27.

Figure 2:
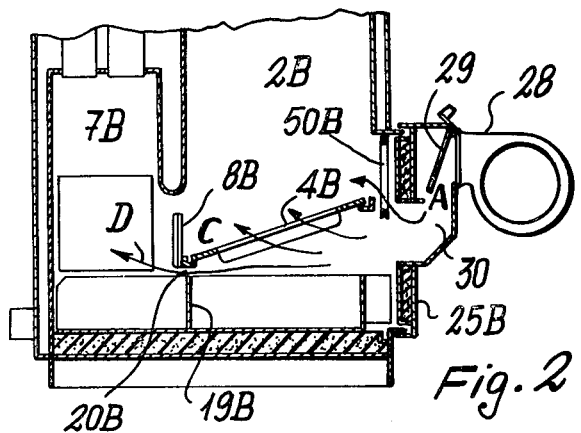
FIG. 2 is a fragmentary sectional view similar to that of FIG. 1, showing a variation.

The boiler of FIG. 2 differs from the former by providing the use of a fan 28 instead of the door 17. A throttle 29 is hinged at the delivery side of the fan and by gravity closes the latter when the fan is not operating. Said fan is mounted on a plate 25B and for its delivery discharges into a conveying channel 30 opening under the grate 4B. As to the remainder, this generator corresponds to that above described, so that the same references associated with letter B have been used for indicating like or corresponding parts.

Figure 3:
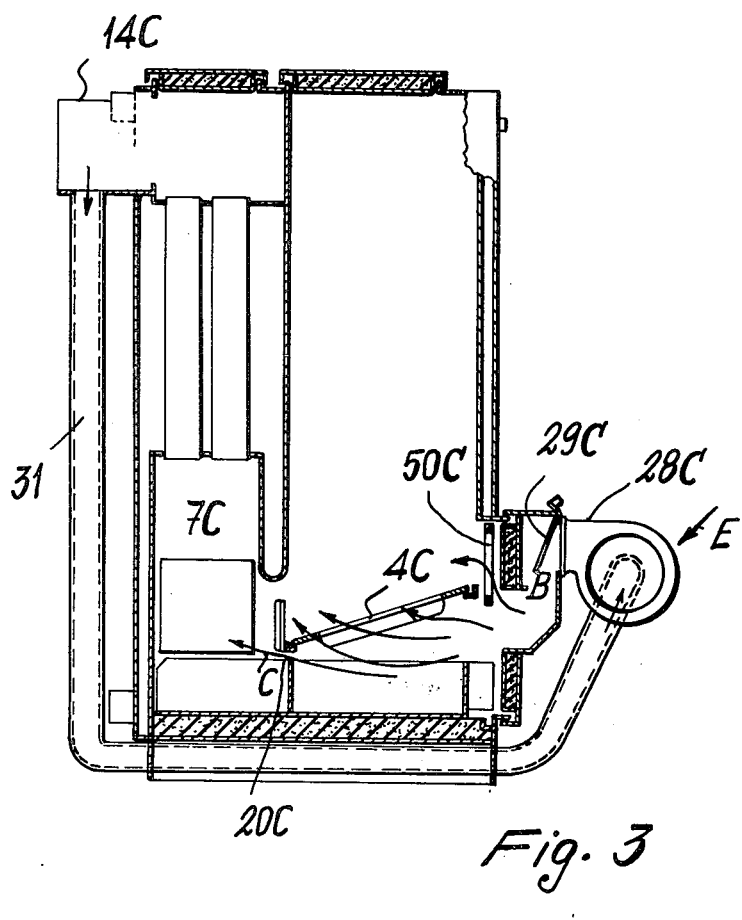
FIG. 3 is a similar sectional view showing a third variation.

The embodiment shown in FIG. 3 corresponds to the above described embodiments and the same references associated with letter C have been used for indicating like or equivalent parts. The fan 28C provides a gas stream formed of fresh air withdrawn from the environment and combustion gases withdrawn through the return conduit 31 from the discharge connector 14C.

The latter will open into the suction side of the fan 28C, of which it will occupy only one section, while the other section will be free, that is facing the atmosphere for the withdrawl of ambient air. Of course, usual valve members, such as of throttle or gate type, could be provided for regulating the inflow and accordingly the proportions of the air-like elements to be mixed.

With this latter solution the combustion efficiency can be increased, improving the fuel-combustion supporter mixture with the production of lower excesses of air; as a secondary result, there will be obtained an emission of smokes less loaded with unburnt products, which would tend to deposit on the surfaces of convective exchange, with the result of reducing the heat exchanged in time.

As a limit case, by drastically reducing the air excess, higher temperatures of the discharge gases could be tolerated, thus avoiding all the risks of condensation in the convective portion, while exhibiting considerably high efficiencies.

In all of the three illustrated cases, the air partly passes through the grate, mostly where the fuel layer is of lower thickness, that is at the lowermost portion of the inclined grate 4, 4B, 4C. Another fraction is preheated under the grate and moves through the aperture 20, 20B, 20C into the post-combustion chamber 7, 7B, 7C where, meeting with the gases evolving from the fuel mass through the passage 15 and vertical grate 8, causes the completion of the combustion of such gases generated by the fuel. Finally, a third fraction enters through the vertical grate 50, 50B, 50C.

Of course, the generator according to the invention is suitable for steam production, for example through any suitable heat exchanger, also different from that shown.

What is claimed is:

1. A generator for the production of steam or hot water operated by fuels having a high content in volatile products, the generator comprising:
   (a) a loading well having side walls, a floor and a roof;
   (b) a door in the loading well for the charging thereof with solid fuels;
   (c) a post combustion chamber positioned adjacent a side wall of the loading well;
   (d) an opening in the lower portion of the side wall of the loading well so that the loading well and the post combustion chamber are in communication with each other;
   (e) a partition extending upwardly from the floor of the loading well so as to partially obstruct the opening;
   (f) a rear grate positioned in the opening substantially vertically so that a lower edge of the rear grate is adjacent an upper edge of the partition with an underlying passage therebetween and an upper edge of the rear grate is adjacent a lower edge of the side wall of the loading well with an overlying passage therebetween;
   (g) an inclined grate near the floor of the loading well, the inclined grate being inclined with respect to the horizontal so that the lowermost portion thereof is substantially adjacent the lower edge of the rear grate;
   (h) access means for the admission of carbureting air into the loading well, the access means comprising an aperture in the side wall of the loading well for admitting air below the inclined grate and incorporating a fan member and a regulator means for controlling the amount of carbureting air admitted to the loading well, the air being divided into a first portion which passes through the inclined grate, solid fuels and thereafter the overlying passage and vertical grate, and a second portion which travels under the inclined grate where it is preheated and thereafter passes through the underlying passage, the first and second portions of the air combining in the post-combustion chamber to bring the still unburnt gases rich in volatile products to combustion; and
   (i) recirculation means for recirculating at least a portion of the combustion gases discharged by the generator back into the loading well, the recirculation means including a return conduit the one end of which is positioned so as to collect at least a portion of the combustion gases discharged by the generator and the other end of which is connected to a suction side of the fan member such that at least a portion of the air pumped into the loading well by the fan member consists of combustion gases previously discharged by the generator.

2. A generator as claimed in 1 further comprising a front grate positioned substantially vertically, the lower edge of the front grate being adjacent to the uppermost edge of the inclined grate, wherein the front grate permits a third portion of air of flow from the access means directly to above the inclined grate where it combines with the first portion of air prior to entering the post-combustion chamber.

* * * * *